United States Patent [19]

Seltzer

[11] Patent Number: 4,715,578

[45] Date of Patent: Dec. 29, 1987

[54] DIAPHRAGM VALVE

[75] Inventor: Clyde W. Seltzer, Newport Beach, Calif.

[73] Assignee: Cla-Val Company, Costa Mesa, Calif.

[21] Appl. No.: 944,976

[22] Filed: Dec. 22, 1986

[51] Int. Cl.⁴ ............................................. F16K 31/128
[52] U.S. Cl. ...................................... 251/25; 92/103 F; 92/103 SD; 251/45; 251/61.1; 251/331
[58] Field of Search ................... 251/25, 28, 45, 61.1, 251/331; 92/103 R, 103 F, 103 SD; 137/488, 489, 489.5

[56] References Cited

U.S. PATENT DOCUMENTS

| | | | |
|---|---|---|---|
| 963,045 | 7/1910 | Hulse | 137/510 |
| 1,182,030 | 5/1916 | O'Dowd | 251/241 |
| 1,496,935 | 6/1924 | Lemmon | 137/494 |
| 1,793,396 | 2/1931 | Haentjens | 251/320 |
| 2,377,227 | 5/1945 | Griswold | 137/53 |
| 2,394,911 | 2/1946 | Griswold | 137/153 |
| 2,677,390 | 5/1954 | Davis et al. | 137/594 |
| 2,877,791 | 3/1959 | Rich | 137/487 |
| 2,905,431 | 9/1959 | Gilbert | 251/61 |
| 2,939,676 | 6/1960 | Kilcoin | 251/331 |
| 2,991,796 | 7/1961 | Griswold | 137/489 |
| 3,038,488 | 6/1962 | Welch et al. | 137/219 |
| 3,078,066 | 2/1963 | Moore | 251/61 |
| 3,217,653 | 11/1965 | Griswold | 103/40 |
| 3,282,556 | 11/1966 | Hancook | 251/122 |
| 3,669,143 | 6/1972 | Reese | 137/512.3 |
| 3,762,681 | 10/1973 | McKinney et al. | 251/61.1 |
| 3,782,682 | 1/1974 | Lale | 251/61.1 |
| 3,856,046 | 12/1974 | Brown et al. | 137/625.28 |
| 4,044,743 | 8/1977 | Eaton | 123/136 |
| 4,181,151 | 1/1980 | Ensign | 137/625.28 |

FOREIGN PATENT DOCUMENTS 1152583 8/1963 Fed. Rep. of Germany .

OTHER PUBLICATIONS

Cla-Val Drawing No. X98063; Seat-Diaphragm Hytrol-3" Diaphragm Valve; 8-6-79.

Primary Examiner—George L. Walton
Attorney, Agent, or Firm—Gausewitz, Carr & Rothenberg

[57] ABSTRACT

A pilot-operated diaphragm valve in which the diaphragm seats on a valve seat having an unconstricted flow annulus therearound, and support regions are provided on the valve seat and on the valve body for support of the diaphragm when in closed position. The support region on the valve seat further performs important sealing functions, as does a sealing lip disposed radially-inwardly of the sealing and support region of the valve seat. To stabilize the diaphragm at various partially and fully open positions, and to augment sealing action when the valve is closed, a spring-pressed poppet is disposed above the diaphragm and is guided by a valve stem and bearing. A peripheral region of the poppet bears a certain relationship to the sealing portions of the valve seat.

18 Claims, 3 Drawing Figures

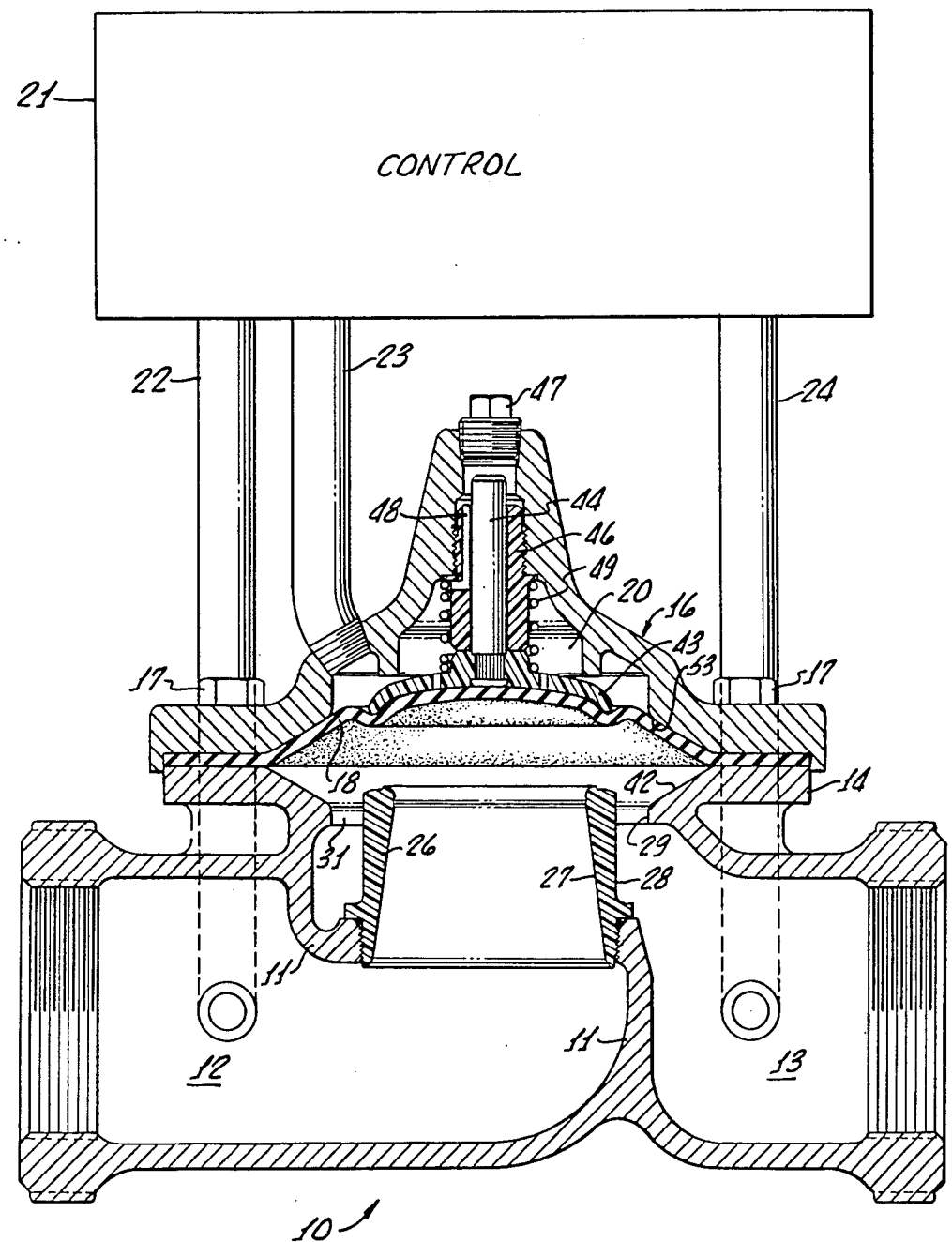

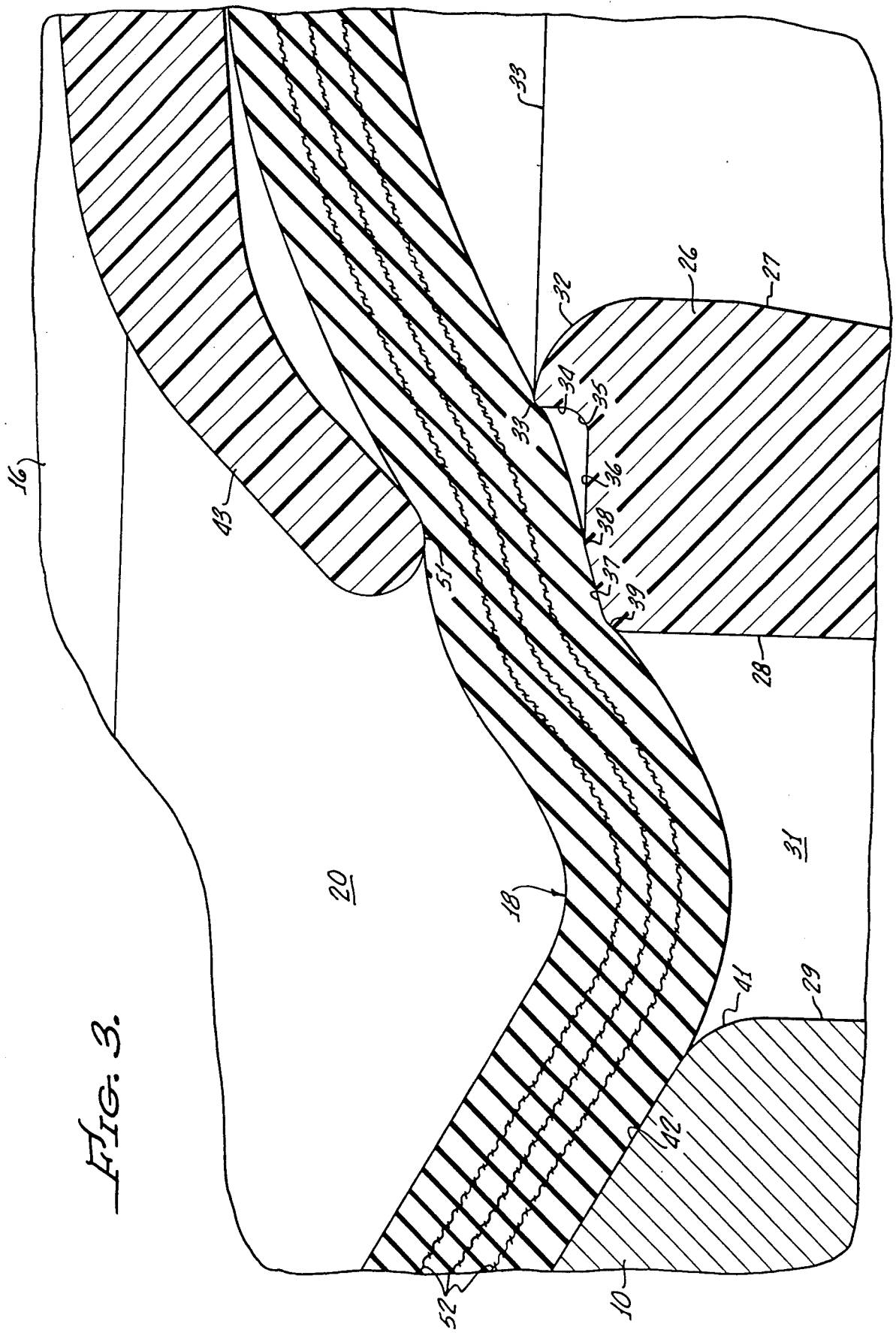

DIAPHRAGM VALVE

BACKGROUND OF THE INVENTION

The assignee of applicant has for several decades operated extensively in the art of diaphragm valves, for example for water systems. The main valve shown in U.S. Pat. No. 3,669,143 is of a type which has long been, and still is, manufactured and sold by such assignee. This valve has a relatively high cost in that it has a fully-stabilized diaphragm that does not itself engage any valve seat. Instead, the valve seat is engaged by a separate poppet element associated with the diaphragm. Because the diaphragm and its associated poppet are fully stabilized, against any tilting or flexing or misalignment, the poppet tends to open simultaneously about the full 360-degree circumference of the valve seat.

In an attempt to reduce costs and employ the diaphragm itself as the element which seats on the valve seat, there was developed at the assignee of applicant a valve shown in Pat. No. 4,181,151. This valve was characterized by a diaphragm supporting element having notches, grooves, or holes therein over which the diaphragm seated and through which the water flowed when the valve was partially or fully open. Such an element is relatively expensive to manufacture even if injection molded of synthetic resin, one reason being that the dies for the injection molding are expensive. Furthermore, because of the flowing of water through notches, ports, etc., there was a certain amount of constriction which reduced flow through the valve in the full-open condition. The valve shown in U.S. Pat. No. 4,181,151 has to date been employed only to a limited extent.

There is a strong need for a valve which can be manufactured at low cost and in relatively large volume, yet which has very excellent operating characteristics in numerous types of pilot-operated applications. These include, among others, pressure-reducing or regulating operation, on-off operation, and flow-modulating operation. Some of the necessary characteristics are full shut-off, low noise even at high pressure differentials and low-flow conditions, and high flow capability when necessary.

SUMMARY OF THE INVENTION

The present valve incorporates a diaphragm that is not connected to anything except peripherally, and is mounted over a combination seat and support element and also over an unconstricted flow annulus.

When the valve is closed, the diaphragm is supported by a portion of the valve body and by a peripheral diaphragm-supporting and sealing region of the combination seat and support element. Sealing, and also support, occur not only at such supporting and sealing region but at a relatively sharp, elevated sealing lip disposed inwardly of the peripheral diaphragm-supporting and sealing region.

In the preferred embodiment, a rigid poppet is mounted above the combination seat and support element, being spring-pressed toward the diaphragm and being guided and prevented from tilting by a stem which slides in a bearing.

The peripheral region of the poppet is oriented relative to the combination seat and support element so that such peripheral region bears downwardly on the diaphragm adjacent the peripheral diaphragm-supporting and sealing region of the combination seat and support element.

Under critical high differential-pressure but low-flow conditions, when valves are most likely to chatter or buzz, the diaphragm lifts off the combination seat and support element at a diametrically-opposite regions instead of around the entire periphery. Such lifting permits only the necessary flow, and raises the poppet against its spring bias. The poppet creates a stabilizing action in this low-flow condition as well as at other diaphragm conditions or positions. When the diaphragm shifts from a condition at which only diametrically-opposite diaphragm regions are lifted off the combination-seat and support element to a condition at which all portions of the diaphragm are spaced away from such element, the progressive increase in the valve opening is primarily circumferential.

When the valve is closed, there is often no pressure differential across the central region of the diaphragm, the pressures in the center of the valve seat and in the chamber above the diaphragm being balanced. However; there is a substantial pressure differential across the flow annulus, and this causes the diaphragm to bulge downwardly. Because of the shape and location of the peripheral diaphragm-supporting and sealing region of the combination seat and support element, and because of the shape and location of a diaphragm-support region of the valve body, such downward bulging effects a major sealing action at such peripheral diaphragm-supporting and sealing region. There is additional sealing and support at the elevated sealing lip, and sealing is enhanced by the peripheral portion of the poppet, the latter being spring pressed downwardly against the diaphragm at a circle of contact lying between the sealing lip and the peripheral diaphragm-supporting and sealing region.

Because of its small number of parts, and the fact that a number of critical valve elements may be injection molded of synthetic resin in relatively economical injection molds, the present valve not only has excellent characteristics specified above (and others), but is economical to manufacture.

BRIEF DESCRIPTION OF THE DRAWINGS

FIG. 2 illustrates the valve in fully-open position when it is connected in a pressurized water system; and FIG. 3 is a greatly enlarged fragmentary view corresponding to a region of FIG. 1 at and outwardly of the combination seat and support element, showing in detail the positions of the parts when the valve is fully closed.

DETAILED DESCRIPTION OF THE PREFERRED EMBODIMENT

Figure 1:
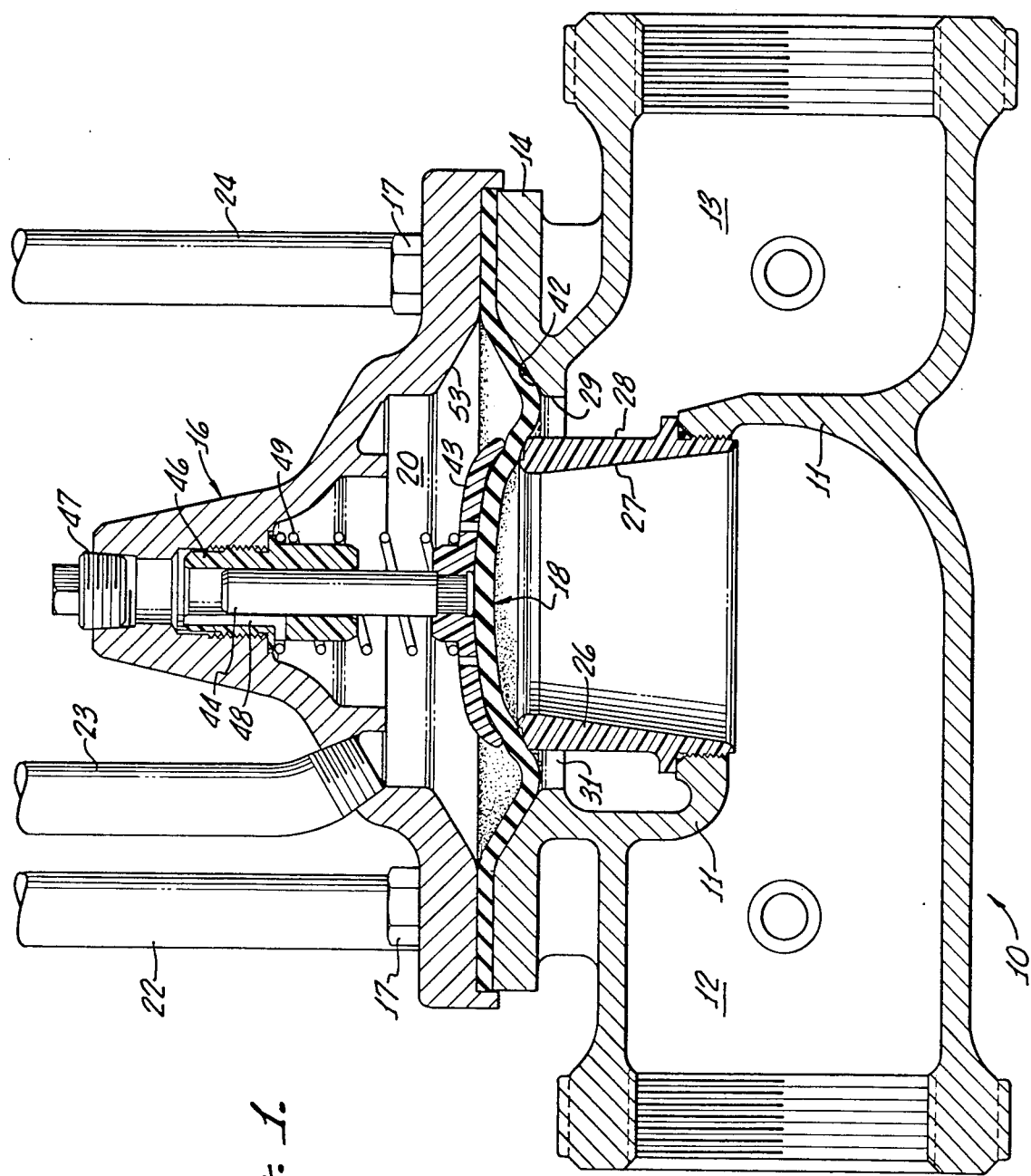
FIG. 1 is a view showing the valve in fully-closed position, when the valve is connected in a pressurized water system and controlled by a suitable control.

Throughout this specification, the valve will be described as incorporated in water systems, for example, as a pressure reducer in a system which supplies water from a water main or tank to the apartments in an apartment building. It is to be understood, however, that the valve may be employed with various other fluids and in numerous other applications.

Referring to FIG. 1, the valve has a conventional valve body 10 that incorporates a dividing wall 11 to separate the valve body into an inlet side 12 and an outlet side 13. The usual flange 14 is provided at the upper portion of valve body 10 for connection to a flanged valve cover 16.

Bolts 17 secure the flange of the valve cover to the flange of the valve body and, furthermore, compress between such flanges the periphery of a diaphragm 18 that has aportures to receive such bolts 17. It is to be understood that there are many bolts, for example eight, equally spaced about the circumference of the cover flange, both flanges being circular when viewed from above. Except for being compressed between the flanges at its periphery, diaphragm 18 need not be connected to anything and is preferably not connected to anything, being instead free-floating and unstabilized except as stated below.

There is defined within cover 16 and above diaphragm 18 the usual diaphragm chamber or control chamber 20 that controls the opening and closing of the valve for the particular application in which the valve is employed. It is emphasized that the valve may be employed in various types of systems, one of which is the pressure-reducing system which will be mentioned below. The valve may also (for example) be employed as a relief valve, an on-off valve, a rate-of-flow control valve (modulating valve), etc.

The valve is controlled by a control or pilot system indicated schematically at 21 in FIG. 2. Typically, there is one line extending from the inlet or upstream side of the valve to the control 21, this being numbered 22. A second line 23 extends from the control to the diaphragm chamber 20, while a third, numbered 24, extends from the control to the outlet or downstream side of the valve. As one example of a control system, reference is made to U.S. Pat. No. 3,669,143, which is hereby incorporated as reference herein as though set forth in full. It is emphasized that the present valve does not require a relatively sophisticated pilot system of the type shown in U.S. Pat. No. 3,669,143, it instead being a feature that a standard and conventional pilot system, as with a restrictor and diaphragm valve for example, are satisfactory and are low in cost.

There will next be described the valve seat element, this being a hollow cylindrical member 26 the lower end of which is threaded into the usual internally-threaded opening in dividing wall 11. An O-ring, not shown, seats between member 26 and wall 11 at the junction between the threaded region of member 26 and a stop flange thereon. The inner surface 27 of member 26 is preferably frustoconical and upwardly convergent for better flow of fluid from the inlet 12 to the outlet 13 of the valve. The outer surface 28, which is coaxial with inner surface 27, is preferably cylindrical. The upper region of outer surface 28 is spaced radially-inwardly from a cylindrical wall portion 29 of the valve body 10, such wall portion defining the opening from the valve body to the diaphragm and the cover. Outer surface 28 and cylindrical wall portion 29 are coaxial and are spaced apart to form an unconstricted flow annulus 31.

Referring particularly to the greatly enlarged view of FIG. 3, there will be described the critical upper end portion of valve seat member 26. The upwardly-convergent inner surface 27 flares or bells outwardly at 32, and the flared surface terminates in a lip 33 that has a very small radial dimension but is not sufficiently sharp to cut into the material forming diaphragm 18. As shown in FIG. 3, this lip 33 sealingly contacts diaphragm 18 when the valve is in closed condition, to perform sealing and diaphragm-supporting functions.

The lip 33 is circumferentially continuous, there being no holes, ports or apertures therein.

Radially-outwardly of lip 33, and closely adjacent thereto, is a drop-off 34 preferably in the form of a cylindrical surface that merges through a preferably rounded (concave) corner 35 with a radial surface 36. Surface 36 extends for a substantial distance away from the cylindrical surface 34. Preferably, radial surface 36 lies on a plane substantially perpendicular to the axis of cylindrical surfaces 28, 34.

Radially-outwardly of surface 36, the upper end of the valve seat member 26 has a beveled surface 37 that meets radial surface 36 at a corner 38. The surface 37 lies at an angle to surface 36 that is not large. To describe surface 37 in another manner, it is a frustoconical surface that is upwardly convergent and lies at only a small angle to a plane perpendicular to the axis of member 26.

At its outer region, surface 37 merges through a rounded corner 39 with the cylindrical surface 28 at the exterior of member 26. Corner 39 preferably has a substantially larger radius than does lip 33.

It is emphasized that the member 26 is not provided with holes, ports, notches, etc. Thus, for example, the surface 37 is continuous, as is lip 33, about the entire circumference of member 26.

Referring again to FIG. 3, the cylindrical wall portion 29 of valve body 10 merges through a radiused surface 41 with a frustoconical surface 42 of the valve body 10. Surface 42 supports the diaphragm 18 when it is in the closed position of FIGS. 1 and 3.

Frustoconical surface 42, which is downwardly convergent, extends upwardly to the region between the flanges of the body and cover. The lower region of frustoconical surface 42 is substantially below (farther from the cover than) the surface 37 on valve seat member 26, which augments the sealing present at such surface 37 and its associated corner 39 as described below, and also, unexpectedly and surprisingly, improves overall operation of the valve with respect to buzzing and chattering. The upper region of frustoconical surface 42 is substantially above both surface 37 and lip 33.

Referring to FIGS. 1 and 2, there will next be described the elements contained in cover 16. What is for convenience referred to as a "poppet", because it moves perpendicularly to the valve seat, but which is actually a diaphragm-stabilizing and seal-augment element, is denoted by the number 43. The poppet 43 is generally disc-shaped and upwardly concave, and has ports therein for prevention of pressure or suction effects on the underside thereof.

The valve seat member 26 and the poppet 43 are preferably injection molded of a suitable synthetic resin, and the latter is rigidly associated with an axial stem 44 that is an easy sliding fit in a cover bearing 46. Bearing 46 is also, preferably, injection molded of synthetic resin. "Easy" does not mean loose, in the preferred form, but instead a free-sliding motion unaccompanied by substantial tilting of the axis of the stem 44. The lower end of the stem is annularly grooved and knurled and is present in the mold during injection molding of poppet 43, so that the synthetic resin flows into the knurled portion and locks the poppet against tilting or rotational movement relative to the stem.

Cover bearing 46 is threaded upwardly into an upwardly-protuberant central portion of cover 16, beneath a plug 47 that seals against leakage of water from diaphragm chamber 20. An internal groove 48 and associated radial port effect communication of fluid between the main diaphragm chamber 20 and the small chamber above the stem 44, for prevention of fluid-pressure effects.

A helical compression spring 49 is mounted around the lower portion of cover bearing 46 and also around an axial boss on poppet 43, urging the poppet toward its downward positions. The spring assures that the diaphragm will move to valve-closing position when desired, so that the valve is normally closed. Furthermore, the spring creates pressure between an edge portion of poppet 43 and an upper region of diaphragm 18, thus cooperating with the diaphragm and creating an effective seal relative to the valve seat even when the fluid pressures are small.

Referring to FIG. 3, the above-indicated edge of poppet 43 is illustrated at 51. As illustrated, it is rounded and is directly above the corner 38 between surfaces 36 and 37.

Before proceeding with a description of the operation of the present valve, there will be given, for purposes of illustration, a specific example of one size of valve.

In the present example, the valve is a 3-inch valve. The diameter of the cylindrical surface 34 is 2.875 inches. The diameter of the circle forming the corner 38 (where surfaces 36 and 37 meet) is 3.188 inches. The diameter of cylindrical surface 28 is 3.380 inches. The angle of frustoconical surface 37 from the horizontal is 16 degrees. The diameter of the circle formed by the lowermost points of poppet 43, that is to say at 51 indicated in FIG. 3, is 3.188 inches. The thickness of diaphragm 18 is 3/16 inch. It is formed of Buna-N rubber having three layers of nylon mesh embedded therein. The shore hardness of the rubber is in the range of 30 to 40 (A scale). The nylon mesh is indicated schematically at 52 in FIG. 3. The axial force exerted by spring 49 is preferably about 30 pounds. The diameter of cylindrical surface 29 of the valve body is 4.26 inches, and the adjacent surface 42 has a 30 degree angle to horizontal.

DESCRIPTION OF ADDITIONAL FUNCTIONS AND OPERATION

It is emphasized that diaphragm 18 can be, and very preferably is, merely punched out of conventional diaphragm material instead of being separately molded for each valve.

For purposes of illustration, let it be assumed that the valve is being employed as a reducing valve in a water line leading to apartments in an apartment or office building. For such an application, and in numerous others, it is important that the valve have very high flow capability. This is true not only because the numerous occupants of the building may use much water during periods of peak demand, but also in order to assure that there will be adequate water pressure present in the event of an emergency such as a fire. On the other hand, there are other periods, usually occurring during the night, when there is no flow at all.

Let it first be assumed that the valve is fully closed as shown in FIGS. 1 and 3, there being no demand. Typically, the operation of control 21 is then such that the pressure in the middle of the valve, that is to say inside of the seat area, is balanced with the pressure in diaphragm chamber 20. This balanced pressure is the full pressure present at inlet 12 of the valve. Because this high inlet pressure is then present in the diaphragm chamber 20, and is much higher than that in the valve outlet 13 and annulus 31, the diaphragm 18 deforms downwardly into the annulus 31. Despite the fact that the diaphragm is not specially molded and does not need to be connected to anything except peripherally, the diaphragm is not harmed by the high differential pressure thereacross at annulus 31. The diaphragm is supported and, furthermore, it is supported in such a way as to enhance sealing.

The diaphragm support is effected at surfaces 42 and 37 and also at corner 39 and lip 33. Edge 51 of poppet 43 further aids in the support. As illustrated in FIG. 3, the diaphragm is in close engagement with the surface 37 and its corners 39 and 38 for effective sealing thereat. Sealing further occurs at lip 33. Sealing at such lip, and at surface 37 and its corners 39 and 38, is enhanced by downward pressure exerted by spring 49 on poppet 43 and thus on its pressure edge 51.

It is to be noted that the flexing of the diaphragm 18 in annulus 31 tends to bend the diaphragm around corner 39 and enhance the sealing thereat. The pressure edge 51 of poppet 43 aids in holding the diaphragm on lip 33 and edge 38, thus enhancing the sealing.

Let it next be assumed that a low demand is initiated downstream from the valve. For example, there may be flushing of a toilet in the middle of the night. With a high differential pressure, and low flow, there is a strong tendency toward loud chattering and buzzing in many prior-art valves. The present valve, on the other hand, has been found to have minimal tendency in such direction.

When there is low flow, the diaphragm 18 does not lift off all portions of its seat or even major portions thereof. Instead, it lifts off surface 37 and lip 33 at what applicant believes to be diametrically-opposite portions of the valve seat. Stated otherwise, there is some "puckering" or tunneling of the diaphragm upwardly from surface 37 and lip 33 at diametrically-opposite regions of the valve seat. The sizes of the openings thus created, and through which flow occurs, depend upon the amount of flow. The locations of the points of opening are dependent upon the characteristics of the diaphragm 18, especially as affected by its internal webbing 52. A diaphragm will bend more readily about one axis than about another, because of the embedded webbing or mesh; the diaphragm puckers at regions of least resistance to bending.

When the small opening or puckering occurs, the poppet 43 lifts so as to remain in engagement with the upper diaphragm surfaces at only the puckered regions, the remaining portions of the diaphragm being then spaced somewhat below pressure edge 51 and remaining in seated condition on and adjacent surface 37 and lip 33. The engagement of the pressure edge 51 with the puckered portions of the diaphragm 18 is believed to create a stabilizing action reducing the tendency toward chatter and buzz.

Let it next be assumed that the demand increases, for example when several people start to draw water for showers. The openings through which water flows at extremely low demand, namely below the puckered portions of the diaphragm 18, then grow circumferentially of surface 37 and of lip 33. Furthermore, the puckered portions of the diaphragm 18 move further away from surface 37 and lip 33 to enlarge the sizes of the flow channels on the underside of diaphragm 18. The poppet 43 moves up only sufficiently to permit such enlargement, and pressure edge 51 remains in engagement with the puckered regions of the diaphragm to provide a stabilizing function.

There arrives a point where the demand for water becomes sufficiently large that the diaphragm 18 lifts off surface 37 and lip 33 about the entire circumferences thereof, so there is flow from annulus 31 not through individual channels beneath the diaphragm but over the full circumference of the seat. Such flow is relatively free of noise and can be very large, being limited only by the size of annulus 31.

When demand is very large, for example during use of fire houses provided as safety equipment in various apartment and office buildings, the valve opens fully. FIG. 2 shows the full open position, the poppet being lifted upwardly by diaphragm 18 until the poppet is seated on the underside of bearing 46 against the bias of spring 49. It is to be noted that the poppet 43 stabilizes the diaphragm in this full-open position also, and that the pressure of the flowing water bulges the diaphragm upwardly radially-outwardly from the poppet edge. The diaphragm is further supported in this full-open position, and in some positions other than full-open, by a frustoconical support surface 53 of cover 16. Preferably, such surface 53 is the mirror image of lower support surface 42 about a plane containing the peripheral region of the diaphragm. The limit of upward travel of poppet 43 is caused to be such that the edge of the poppet is in generally the same plane as the upper edge of upper support surface 53 when the poppet is fully elevated.

When the demand for water reduces, the poppet 13 and its spring 49, and the increasing pressure in diaphragm chamber 20, cooperate to lower the diaphragm 18 and reduce the flow area above the valve seat. During such action, the poppet 43 continues to maintain a stabilizing effect. Should the demand cease, either gradually or abruptly, the diaphragm is forced downwardly on its seat by the water pressure in chamber 20 and by the poppet 43 and its spring.

The bearing 46 and stem 44 assure that the pressure edge 51 will seat on the diaphragm above corner 38 to achieve the most effective closing and sealing of the valve.

It is important that the valve not leak, because in periods of zero demand the pressure in the apartment building should not be allowed to build up. If the pressure did build up to, for example, the pressure in the valve inlet 12, a person turning on a faucet would receive a large surprise. Furthermore, the pressure in the system could break pipes or, for example, break the plastic lines now frequently employed relative to reverse-osmosis water purifier systems.

In summary, the present valve has numerous advantages relative to cost, coupled with highly important advantages relative to excellent regulation at low flow despite high pressure differentials, high flow capability when desired, excellent deadend regulation, full shutoff, low noise, and substantial absence of chatter and buzz. This list is not intended to be comprehensive. For example, it is pointed out that the present valve has a relatively low pressure drop because of absence of restrictions in the annulus 31.

When the present valve is so connected as to have a pressure-reducing or regulating function, the inlet pressure may be (for example) 170 psi, and the outlet pressure (for example) 50 psi. The valve may also be employed as a relief valve, it being desired that the pilot system cause a high upstream of pressure to be periodically reduced to a given pressure only slightly lower than such high upstream pressure. It is emphasized that a pilot system is always employed, this being vastly different from relief-valve systems which incorporate only a strong spring that presses on a poppet or diaphragm. In the present system, the actuation of the diaphragm is done essentially by the pressure in the diaphragm chamber as determined by the control 21, the spring 49 being relatively light and being employed in asssociation with the poppet to create a stabilizing and sealing function.

Also, as stated above, the present system may be employed as an on-off valve or, conversely, as a modulating valve to regulate rate of flow. During the modulation, the poppet effectively aids in stabilizing the diaphragm.

The foregoing detailed description is to be clearly understood as given by way of illustration and example only, the spirit and scope of this invention being limited solely by the appended claims.

What is claimed is:

1. A pilot-operated diaphragm valve, which comprises:
    (a) a valve body having an inlet and an outlet,
    (b) a valve cover,
    (c) a diaphragm mounted, at its periphery, between said body and cover,
        the central regions of said diaphragm being adapted to move tranversely of the peripheral regions thereof,
    (d) a combination diaphragm seat and diaphragm support sealingly mounted in said valve body at the opening between said inlet and outlet thereof, on the opposite side of said diaphragm from said cover,
        said valve body, and said combination diaphragm seat and diaphragm support, defining between them a substantially unconstricted flow annulus, said combination diaphragm seat and diaphragm support including a circumferentially continuous sealing lip adapted to be sealingly engaged by said diaphragm,
    (e) means on said combination diaphragm seat and diaphragm support to support said diaphragm at regions thereof radially-inwardly of, and adjacent, said flow annulus when said diaphragm is seated on said combination seat and support,
        said support means (e) being spaced from said lip sufficiently that said diaphragm will seal against said lip without touching said combination seat and support at regions outwardly adjacent said sealing lip, when said diaphragm is seated on said lip and on said support means (e),
    (f) means on said valve body to support said diaphragm, at regions radially-outwardly of, and adjacent, said flow annulus when said diaphragm is seated on said combination seat and support,
        said support means on said valve body being sufficiently low that, when there is a high pressure differential across said diaphragm and said diaphragm is fully seated on said combination diaphragm seat and diaphragm support, said diaphragm will bend downwardly around the outer portion of said support means (e) and into said substantially unconstricted flow annulus, and
    (g) means to vary the fluid pressure in the chamber defined by said cover and said diaphragm, to cause opening and closing of said valve.

2. The invention as claimed in claim 1, in which said diaphragm is not connected to anything except at the periphery thereof.

3. The invention as claimed in claim 2, in which said diaphragm is a uniform-thickness elastomeric diaphragm that is not specially molded but instead stamped out of a sheet of diaphragm material, said material having synthetic resin mesh embedded therein parallel to the diaphragm surfaces.

4. The invention as claimed in claim 1, in which a poppet is mounted in said cover coaxially of said combination diaphragm seat and diaphragm support, the periphery of said poppet being sized to engage said diaphragm above said combination diaphragm seat and diaphragm support, and in which spring means are provided to bias said poppet toward said diaphragm.

5. The invention as claimed in claim 1, in which said support means on said valve body is surface means encompassing said flow annulus, and convergent in a direction away from said cover, the outer part of said surface means being higher than is said combination diaphragm seat and diaphragm support, the inner part of said surface means being lower than is said combination diaphragm seat and diaphragm support.

6. A pilot-operated diaphragm valve which comprises:

(a) a valve body having an inlet and an outlet, (b) a valve cover, (c) a diaphragm mounted, at its periphery, between said body and cover,
the central regions of said diaphragm being adapted to move transversely of the peripheral regions thereof, (d) a combination diaphragm seat and diaphragm support sealingly mounted in said valve body at the opening between said inlet and outlet thereof, and on the opposite side of said diaphragm from said cover,
said valve body, and said combination diaphragm seat and diaphragm support, defining between them a radially-extending substantially-unconstricted flow annulus,
said diaphragm being adapted to seat directly on said combination seat and support, with no intervening elements,
said combination diaphragm seat and diaphragm support including a circumferentially continuous sealing lip adapted to be sealingly engaged by said diaphragm, (e) means on said combination diaphragm seat and diaphragm support to support said diaphragm at regions thereof radially-inwardly of, and adjacent, said flow annulus, when said diaphragm is seated on said combination seat and support,
said means being a circumferentially continuous peripheral region of said combination diaphragm seat and diaphragm support,
said support means (e) being lower than said sealing lip, and being spaced outwardly from said lip sufficiently that said diaphragm will not touch said combination seat and support at regions outwardly adjacent said sealing lip, when said diaphragm is seated on said lip and on said support means (e), even when there is a high pressure differential across said diaphragm and diaphragm is fully seated on said combination seat and support, (f) means on said valve body to support said diaphragm, at regions radially-outwardly of, and adjacent, said flow annulus, when said diaphragm is seated on said combination seat and support,
said means on said valve body being a downwardly-convergent diaphragm-support surface on said valve body, said diaphgram-support surface being coaxial with said diaphragm seat and diaphragm support,
the region of said diaphgram-support surface (f) nearest said flow annulus being lower than said support means (e),
said diaphragm bending into said flow annulus, around said circumferentially continuous peripheral region of said combination seat and support when there is a high pressure differential across said diaphragm, and (g) means to vary the fluid pressure in the chamber defined by said cover and said diaphragm to cause opening and closing of said valve.

7. The invention as claimed in claim 6, in which said circumferentially continuous peripheral region of said combination diaphragm seat and diaphragm support is an upwardly-convergent frustoconical surface.

8. The invention as claimed in claim 5, in which said combination diaphragm seat and diaphragm support has said circumferentially-continuous lip relatively near the inner portion thereof, has a drop-off on the outer side of said lip, has a generally radial surface extending outwardly from said drop-off, and has said circumferentially continuous peripheral region outwardly of said radial surface, there being a corner between said radial surface and said peripheral region, said peripheral region being beveled.

9. The invention as claimed in claim 6, in which a spring-pressed poppet is mounted in said cover on the side of said diaphragm remote from said combination diaphragm seat and diaphragm support, the diameter of said poppet generally corresponding to that of said combination seat and support.

10. The invention as claimed in claim 9, in which stem and bearing means are provided to guide said poppet and prevent tilting thereof, and in which a helical compression spring is provided to effect biasing of said poppet toward said combination seat and support.

11. The invention as claimed in claim 8, in which a poppet is provided in said cover on the opposite side of said diaphragm from said combination diaphragm seat and diaphragm support, in which means are provided to guide said poppet and prevent tilting thereof and prevent said poppet from moving away from a condition coaxial with said combination seat and support, in which said poppet has a downwardly-extending peripheral pressure edge sized to engage said diaphragm above said corner between said radial surface of said combination seat and support and said peripheral region thereof.

12. The invention as claimed in claim 6, in which said cover has an upwardly-convergent diaphragm support surface adapted to support said diaphragm when the valve is fully open.

13. The invention as claimed in claim 12, in which a poppet is mounted in said cover on the side of said diaphragm remote from said combination seat and support, in which means are provided to guide said poppet toward and away from said combination seat and support and to prevent tilting of said poppet, and in which stop means are provided to stop said poppet at a predetermined position spaced from said diaphragm seat and support, said predetermined position being correlated to said upwardly-convergent surface of said cover so that said upwardly-convergent surface and said poppet combine to support said diaphragm when said valve is in fully open condition, and in which a compression spring is provided to bias said poppet toward said combination seat and support.

14. The invention as claimed in claim 6, in which said diaphragm is not specially molded, instead being a flat sheet of elastomeric diaphragm material having synthetic resin mesh embedded therein and having parallel upper and lower surfaces, and in which said diaphragm is relatively thick.

15. The invention as claimed in claim 14, in which said diaphragm has a shore hardness in the range of about 30 to about 40 (A scale), and in which said diaphragm is about ⅜ inch thick.

16. The invention as claimed in claim 14, in which said diaphragm is not connected to anything except at the periphery thereof.

17. The invention as claimed in claim 6, in which said diaphragm is not connected to anything except at the periphery thereof.

18. The invention as claimed in claim 6, in which said diaphragm-support surface recited in clause (f) has an upper-outer portion that is higher than is said combination diaphragm seat and diaphragm support, and has a lower-inner portion that is lower than is said combination diaphragm seat and diaphragm support.

* * * * *

UNITED STATES PATENT AND TRADEMARK OFFICE
CERTIFICATE OF CORRECTION

PATENT NO. : 4,715,578

DATED : December 29, 1987

INVENTOR(S) : Clyde W. Seltzer

It is certified that error appears in the above-identified patent and that said Letters Patent is hereby corrected as shown below:

Claim 8 (Column 10, line 25), please delete "5" and substitute therefor ---6---.

Signed and Sealed this

Seventh Day of February, 1989

Attest:

DONALD J. QUIGG

Attesting Officer

Commissioner of Patents and Trademarks